United States Patent
Baddour et al.

(10) Patent No.: US 11,629,058 B2
(45) Date of Patent: Apr. 18, 2023

(54) METAL CARBIDES AND METHODS OF MAKING THE SAME

(71) Applicant: Alliance for Sustainable Energy, LLC, Golden, CO (US)

(72) Inventors: Frederick G. Baddour, Denver, CO (US); Anurag Kumar, Golden, CO (US); Kurt Michael Van Allsburg, Denver, CO (US); Daniel Ruddy, Arvada, CO (US); Susan E. Habas, Arvada, CO (US); Andrew Royappa, Cantonment, FL (US); Brittney E. Petel, Lakewood, CO (US); Claire Townsend Nimlos, Lakewood, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 158 days.

(21) Appl. No.: 17/210,076

(22) Filed: Mar. 23, 2021

(65) Prior Publication Data
US 2021/0309525 A1    Oct. 7, 2021

Related U.S. Application Data

(60) Provisional application No. 62/993,487, filed on Mar. 23, 2020.

(51) Int. Cl.
| | |
|---|---|
| *C01B 32/90* | (2017.01) |
| *B01J 27/22* | (2006.01) |
| *B01J 37/08* | (2006.01) |
| *C22C 3/00* | (2006.01) |
| *C01B 32/914* | (2017.01) |
| *C07F 11/00* | (2006.01) |

(52) U.S. Cl.
CPC ............... *C01B 32/90* (2017.08); *B01J 27/22* (2013.01); *B01J 37/08* (2013.01); *C01B 32/914* (2017.08); *C22C 3/00* (2013.01); *C07F 11/00* (2013.01)

(58) Field of Classification Search
CPC ........ C01B 32/90; C01B 32/914; B01J 27/22; C22C 3/00
See application file for complete search history.

(56) References Cited

FOREIGN PATENT DOCUMENTS

WO    2020/016898 A1    1/2020

OTHER PUBLICATIONS

Bell et al., Adv. Mater., (1998), 10(11), 846-849.*
Ardizzoia et al., "A Quantitative Description of the σ-Donor and π-Acceptor Properties of Substituted Phenanthrolines", European Journal of Inorganic Chemistry, Jul. 2016, pp. 3829-3837.
Baddour et al., "Synthesis of α-MoC1-x Nanoparticles with a Surface-Modified SBA-15 Hard Template: Determination of Structure-Function Relationships in Acetic Acid Deoxygenation", Angewandte Chemie International Edition, 2016, vol. 55, No. 31, pp. 9026-9029.
Baddour et al., "Late-Transition-Metal-Modified β-Mo2C Catalysts for Enhanced Hydrogenation during Guaiacol Deoxygenation", ACS Sustainable Chemistry & Engineering, 2017, vol. 5, No. 12, pp. 11433-11439.
Darensbourg et al., "A convenient synthesis of cis-Mo(CO)4L2 derivatives (L=Group 5a ligand) and a qualitative study of their thermal reactivity toward ligand dissociation", Inorganic Chemistry, 1978, vol. 17, No. 9, pp. 2680-2682.
Schaidle et al., "Experimental and Computational Investigation of Acetic Acid Deoxygenation over Oxophilic Molybdenum Carbide: Surface Chemistry and Active Site Identity", ACS Catalysis, 2016, vol. 6, pp. 1181-1197.
Stiddard, "2,2'-Bipyridyl derivatives of Group VI carbonyls", Journal of the Chemical Society, 1962, pp. 4712-4715.
Volpe et al., "Compounds of Molybdenum and Tunsten with High Specific Surface Area", Jounal of Silid State Chemistry, 1985, Vil. 59, pp. 348-356.

* cited by examiner

*Primary Examiner* — Yong L Chu
(74) *Attorney, Agent, or Firm* — Michael A. McIntyre

(57) ABSTRACT

The present disclosure relates to a method for producing a metal carbide, where the method includes thermally treating a molecular precursor in an oxygen-free environment, such that the treating produces the metal carbide and the molecular precursor includes

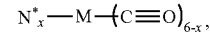

where M is the metal of the metal carbide, N* includes nitrogen or a nitrogen-containing functional group, and x is between zero and six, inclusively.

8 Claims, 7 Drawing Sheets

METAL CARBIDES AND METHODS OF MAKING THE SAME

CROSS-REFERENCE TO RELATED APPLICATIONS

This application claims priority from U.S. Provisional Patent Application No. 62/993,487 filed on Mar. 23, 2020, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Metal carbide catalysts have potential as high-performance catalysts for several renewable energy applications including biomass upgrading, battery materials, and electrocatalysis. However, despite the promising performance of transition metal carbides, there are limitations to the commercial potential of these materials due to difficulties when manufacturing them at industrial scales. Currently, carbides are typically prepared via carburization of oxidic precursors with a carbon source (typical carburization gas: 15% $CH_4$/$H_2$) at temperatures above 600° C. Thus, there remains a need for less hazardous, less energy intensive, and more economically feasible synthesis routes for making molybdenum carbides that may be used in both existing and emerging alternative energy technologies.

SUMMARY

An aspect of the present disclosure is a method for producing a metal carbide, where the method includes thermally treating a molecular precursor in an oxygen-free environment, such that the treating produces the metal carbide, where the molecular precursor includes

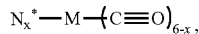

M is the metal of the metal carbide, N* includes nitrogen or a nitrogen-containing functional group, and x is between zero and six, inclusively. In some embodiments of the present disclosure, N* may include at least one of

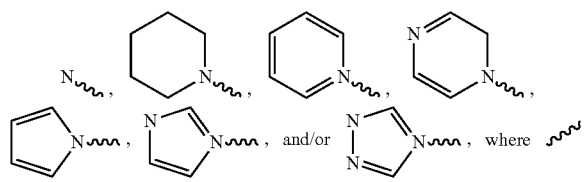

indicates the bond between N* and M. In some embodiments of the present disclosure, x may be equal to two, and the molecular precursor may include

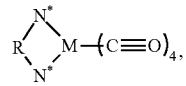

where R comprises at least one of a covalent bond or a linking group.

In some embodiments of the present disclosure, the linking group may include a hydrocarbon. In some embodiments of the present disclosure, the hydrocarbon may be a branched hydrocarbon and/or a straight-chained hydrocarbon. In some embodiments of the present disclosure, the hydrocarbon may be a saturated hydrocarbon and/or an unsaturated hydrocarbon. In some embodiments of the present disclosure, x may be equal to three, and three N* functional groups may be covalently linked by two R groups positioned between adjacent N* functional groups. In some embodiments of the present disclosure, the molecular precursor may include at least one of [Mo(bpy)(CO)$_4$], [Mo($^t$Bu-bpy)(CO)$_4$], [Mo(Me-bpy)(CO)$_4$], [Mo(ethyl-bpy)(CO)$_4$], [Mo(nonyl-bpy)(CO)$_4$], [Mo(neopentyl-bpy)(CO)$_4$], [Mo(en)(CO)$_4$], [Mo(TMEDA)(CO)$_4$], [Mo(bipz)(CO)$_4$], [Mo(phen)(CO)$_4$], [Mo(pzquin)(CO)$_4$], and/or [Mo(btaz)(CO)$_4$].

An aspect of the present disclosure is a method for producing a metal carbide, where the method includes reacting a metal-containing precursor that includes at least one of $ML_u$ or $MX_v$ with an amine-containing molecule (NR) to produce a gel intermediate of at least one of $M(NR)_xL_y$ or $M(NR)_xX_z$, and thermally treating the gel intermediate in an oxygen-free environment, where the treating produces the metal carbide. M is the metal of the metal carbide, L is a functional group covalently bonded to M, X is a functional group ionically bonded to M, $0 \leq u \leq 6$, $0 \leq v \leq 6$, $1 \leq x \leq 10$, $y \leq u$, and $z \leq v$. In some embodiments of the present disclosure, the amine-containing molecule may include an amine (NR'$_3$), and R' may include at least one of a hydrogen atom and/or a hydrocarbon.

In some embodiments of the present disclosure, each R' may be the same or different. In some embodiments of the present disclosure, the hydrocarbon may include at least one of a straight-chained hydrocarbon and/or a branched hydrocarbon. In some embodiments of the present disclosure, the hydrocarbon may include at least one of a saturated hydrocarbon and/or an unsaturated hydrocarbon. In some embodiments of the present disclosure, the amine-containing molecule may include a polyamine (NR')$_n$, where R' includes at least one of a covalent bond and/or a linking group, and n is between 1 and 2000, inclusively. In some embodiments of the present disclosure, each R' may be the same or different. In some embodiments of the present disclosure, the linking group may include a hydrocarbon. In some embodiments of the present disclosure, the hydrocarbon may include at least one of a straight-chained hydrocarbon and/or a branched hydrocarbon. In some embodiments of the present disclosure, the hydrocarbon may include at least one of a saturated hydrocarbon and/or an unsaturated hydrocarbon.

An aspect of the present disclosure is a composition that includes at least one of β-Mo$_2$C and/or α-MoC$_{1-x}$, where $0 \leq x < 1$ and the composition has a surface area between about 20 m$^2$/g and about 500 m$^2$/g. An aspect of the present disclosure is a method for hydrogenating a reactant by contacting the reactant and hydrogen (H$_2$) with a catalyst, where the reactant includes a carbon-carbon double-bond and the catalyst includes at least one of β-Mo$_2$C and/or α-MoC$_{1-x}$, where 0≤x<1, and the catalyst has a surface area between about 20 m$^2$/g and about 500 m$^2$/g.

BRIEF DESCRIPTION OF THE DRAWINGS

Some embodiments are illustrated in referenced figures of the drawings. It is intended that the embodiments and figures disclosed herein are to be considered illustrative rather than limiting.

DETAILED DESCRIPTION

Figure 1:
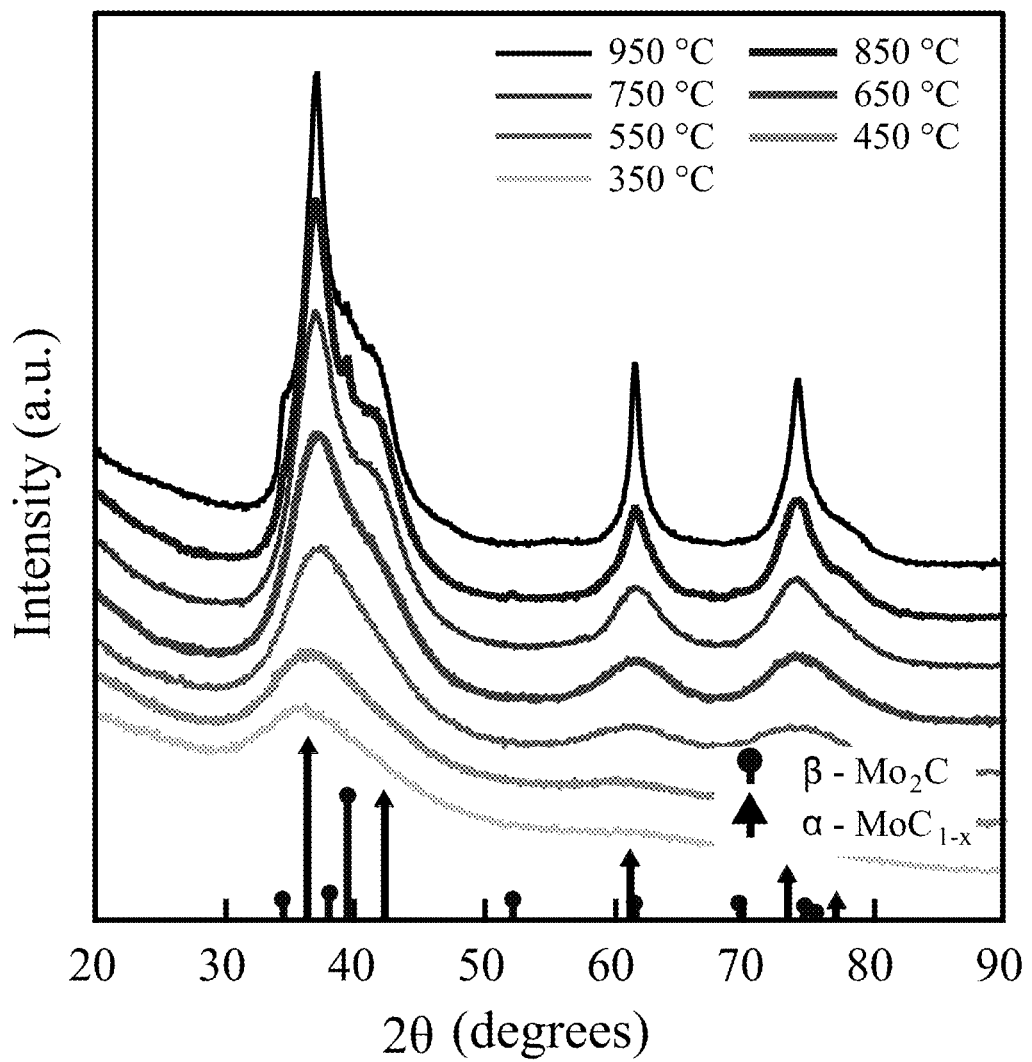
FIG. 1 illustrates XRD data of molybdenum carbide obtained from the thermal decomposition of [Mo(bpy)(CO)$_4$], according to some embodiments of the present disclosure.

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein, the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

Among other things, the present disclosure relates to the synthesis of bulk and supported transition metal carbides, e.g., molybdenum carbide (α-MoC$_{1-x}$ or β-Mo$_2$C), via carburization-free molecular routes that lead to the formation of, among other things, catalytically active α-MoC$_{1-x}$ and/or β-Mo$_2$C at synthesis temperatures between about 250° C. and about 950° C. or as low as between about 250° C. and about 300° C. As used herein, the term "carburization-free" refers to a synthesis route that is completed in the absence of a gaseous carbon source (e.g., methane) and/or diatomic hydrogen. Thus, the methods described herein have the advantage of not requiring the use of flammable gas mixtures. In addition, as shown herein, the resultant carbides may be immobilized on commonly used catalyst support materials, using industry-standard methods such as wet impregnation. Two different carburization-free routes to synthesize molybdenum carbides are described herein; a single-source molecular precursor route and a "gel intermediate" route.

As described herein, in some embodiments of the present disclosure, the first synthesis route to bulk molybdenum carbide takes advantage of the thermolytic (i.e., using only heat) decomposition of a single-source molecular precursor, with specific examples being [Mo(bpy)(CO)$_4$] (bpy=2,2'-dipyridyl) and [Mo('Bu-bpy)(CO)$_4$] ('Bu-bpy=4,4'-di-tert-butyl-2,2'-dipyridyl), in a single step, requiring no reactive gases or additional carbon sources. These two single-source molecular precursors, and others like them, are generally referred to herein as "precursors".

The structures of these two exemplary precursors are shown below; Structure 1 illustrates [Mo(bpy)(CO)$_4$] and Structure 2 illustrates [Mo('Bu-bpy)(CO)$_4$]. Other exemplary precursors based on bidentate nitrogen ligands are shown in Scheme 1 below and include at least one of [Mo(Me-bpy)(CO)$_4$] (Me-bpy=4,4'-dimethyl-2,2'-dipyridyl), [Mo(ethyl-bpy)(CO)$_4$] (ethyl-bpy=4,4'-diethyl-2,2'-dipyridyl), [Mo(nonyl-bpy)(CO)$_4$] (nonyl-bpy=4,4'-dinonyl-2,2'-dipyridyl), [Mo(neopentyl-bpy)(CO)$_4$] (neopentyl-bpy=4,4'-dineopentyl-2,2'-dipyridyl), [Mo(en)(CO)$_4$] (en=ethylenediamine), [Mo(TMEDA)(CO)$_4$] (TMEDA=N,N,N',N'-tetramethylethylenediamine), [Mo(bipz)(CO)$_4$] (bipz=2,2'-bipyrazine), [Mo(phen)(CO)$_4$] (phen=phenanthroline), [Mo(pzquin)(CO)$_4$]

(pzquin=pyrazino[2,3-f]quinoxaline), and/or [Mo(btaz)(CO)$_4$] (btaz=bis(triazol-1-yl)methane).

Additional exemplary precursors, based on monodentate nitrogen-based ligands, are shown in Scheme 2 (Structures 3-13) and have the general formula [MoL$_x$(CO)$_{6-x}$], where typical values of x range between 1 and 4, with x most commonly equal to two. Where x=2 or more, the ligands may be the same or different. Examples of monodentate ligands include ammonia, pyridine, piperidine, pyrrole, 1H-pyrrole-1-carbonitrile (NC-pyrrole), pyrrolidine, imidazole, triazole, quinoline, trialkylamine (in which alkyl indicates a linear or branched hydrocarbon chain or H, and the three alkyl groups may be the same or different, e.g., trimethylamine or triethylamine), or acetonitrile. For the cyclic monodentate ligands such as pyridine, the exemplary ligands may also be substituted with linear or branched hydrocarbon chains (e.g., L=4-tert-butylpyridine). Finally, two exemplary precursors with tridentate nitrogen ligands are [Mo(terpyridine)(CO)$_3$] (terpyridine=2,6-bis(2-pyridyl)pyridine) and [Mo(diethylenetriamine)(CO)$_3$] (Scheme 2, Structures 14-15).

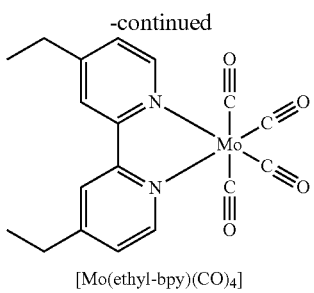

[Mo(ethyl-bpy)(CO)$_4$]

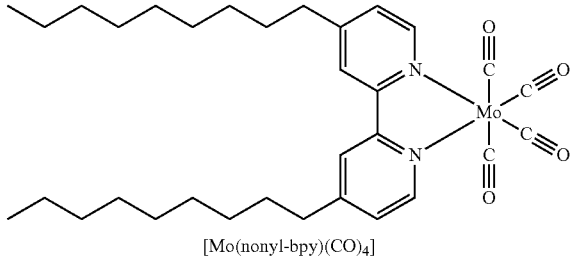

[Mo(nonyl-bpy)(CO)$_4$]

Structure 1

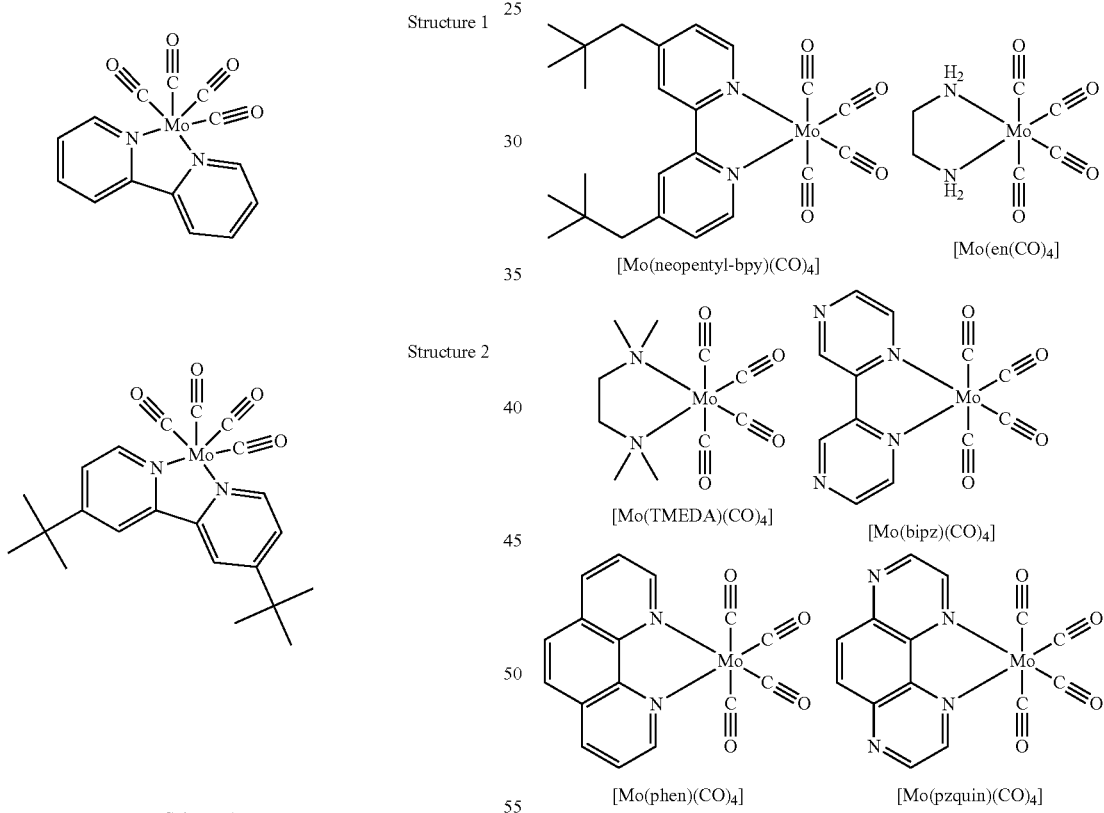

[Mo(neopentyl-bpy)(CO)$_4$]    [Mo(en)(CO)$_4$]

[Mo(TMEDA)(CO)$_4$]    [Mo(bipz)(CO)$_4$]

[Mo(phen)(CO)$_4$]    [Mo(pzquin)(CO)$_4$]

[Mo(btaz)(CO)$_4$]

Structure 2

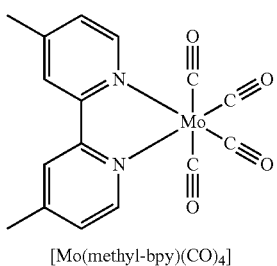

Scheme 1

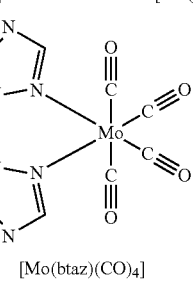

[Mo(methyl-bpy)(CO)$_4$]

Scheme 2

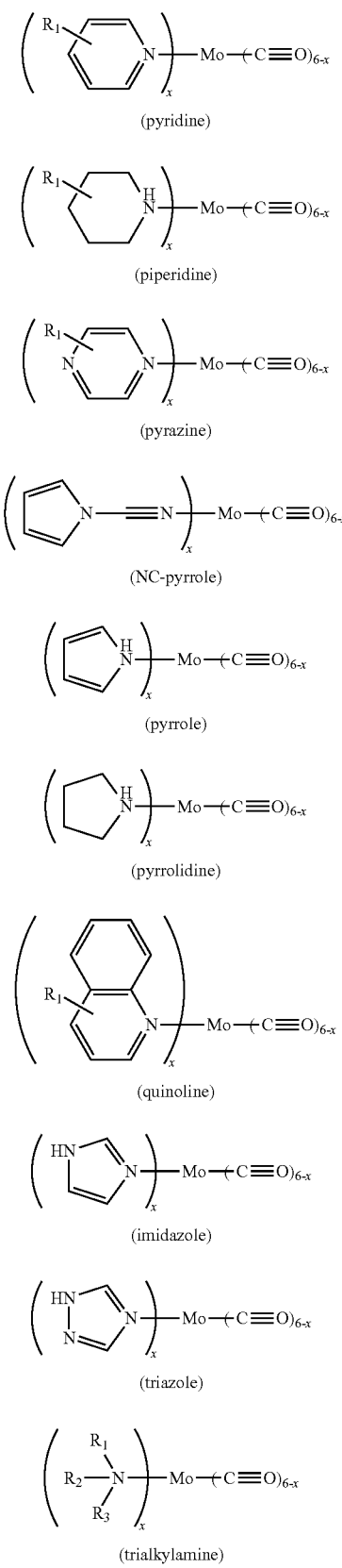

(pyridine)

(piperidine)

(pyrazine)

(NC-pyrrole)

(pyrrole)

(pyrrolidine)

(quinoline)

(imidazole)

(triazole)

(trialkylamine)

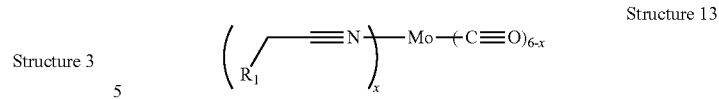

(nitrile)

(terpyridine)

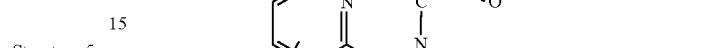

(diethylenetriamine)

Structure 1 and Structure 2 and the structures shown in Scheme 1 and Scheme 2 can be generalized to Structure 16 below, which illustrates generalized structures for monodentate, bidentate, and tridentate precursors, respectively.

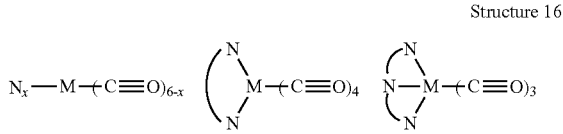

The notations, $N_x$, N—N, and N—N—N, each represent a nitrogen-containing ligand that may be the same or different than the other nitrogen-containing groups of a precursor. M is a transition metal atom, for example molybdenum. In some embodiments of the present disclosure, the $N_x$ ligand may have a substituent group including at least one of a hydrogen atom and/or a hydrocarbon chain, straight and/or branched, having between 1 and 20 carbon atoms. Referring to Scheme 2 above, each of $R_1$, $R_2$, and $R_3$ may be a functional group that includes at least one of a hydrogen atom and/or a hydrocarbon chain, straight and/or branched, having between 1 and 20 carbon atoms. In some embodiments, these hydrocarbon chains may be saturated hydrocarbon chains. A saturated hydrocarbon chain may include an alkyl group such as at least one of a methyl group, an ethyl group, a propyl group, and/or a butyl group. An alkyl group may be a straight chain or branched. In some embodiments of the present disclosure, a hydrocarbon chain may be unsaturated (e.g., include at least one carbon-carbon double-bond and/or triple-bond). In some embodiments of the present disclosure, the hydrocarbon chain may include an element such as at least one of sulfur, nitrogen, phosphorus, and/or a halogen. Examples of transition metals of interest include molybdenum, tungsten, chromium, niobium, tantalum, titanium, and/or rhenium.

Reaction 1A shows the generalized thermal decomposition-of the generalized bidentate precursor shown above in Structure 16, to produce a metal carbide, MC, and carbon, where x in $N_x$ is greater than one. At least one of carbon monoxide and/or carbon dioxide are produced, along with a nitrogen-containing decomposition product (denoted as $N_x$ in Reaction 1A). Similar reactions apply for monodentate and tridentate precursors.

Reaction 1A

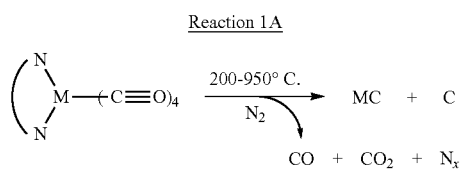

Reaction 1B presents a generalized thermal decomposition reaction for all of the precursors types described herein (e.g., monodentate, bidentate, and tridentate), each capable of thermally degrading to a metal carbide:

Reaction 1B

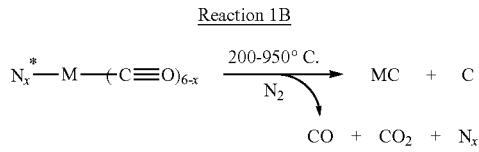

N* is a functional group that includes a nitrogen atom or a nitrogen-containing functional group, and $N^*_x$ indicates that there may be x number of N* groups, with x typically in the range of one to six. Referring to Schemes 1 and 2 above, examples of N* include at least one of

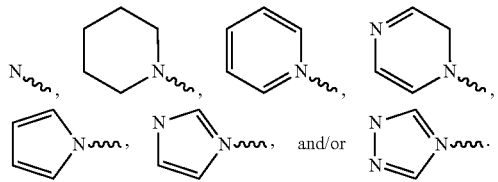

Further, for precursors having two or more N* functional groups, adjacent N* groups may be connected by at least one covalent bond. This is illustrated for the example where x equals two (i.e., bidentate) in Reaction 1C below:

Reaction 1C

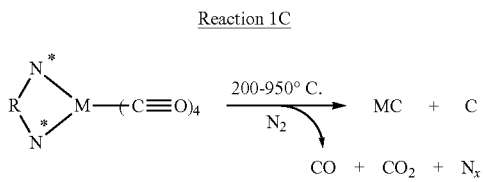

where R may be a covalent bond and/or a linking group such as a hydrocarbon, where the hydrocarbon may include a straight chain hydrocarbon, a branched chain hydrocarbon, and/or a cyclic hydrocarbon and where the hydrocarbon may be saturated and/or unsaturated.

Reactions 1A, 1B and/or 1C may proceed at temperatures between about 200° C. and about 950° C., or between about 250° C. and about 950° C., in an inert environment (e.g., in the absence of oxygen using gases like nitrogen, argon, and/or helium), heating at a rate between about 0.5° C./min and about 10° C./min and holding at the final temperature for a time period between about 1 hour and about 10 hours. Reaction 2 and Reaction 3 illustrate specific examples of Reaction 1, for [Mo(bpy)(CO)$_4$] and [Mo('Bu-bpy)(CO)$_4$], respectively, according to some embodiments of the present disclosure.

Reaction 2

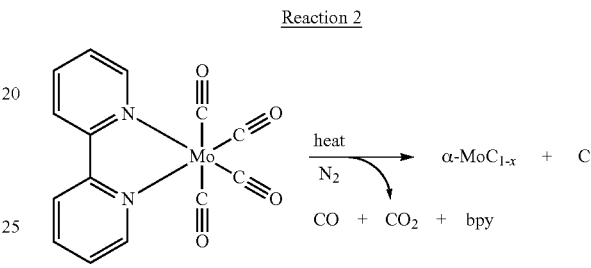

Reaction 3

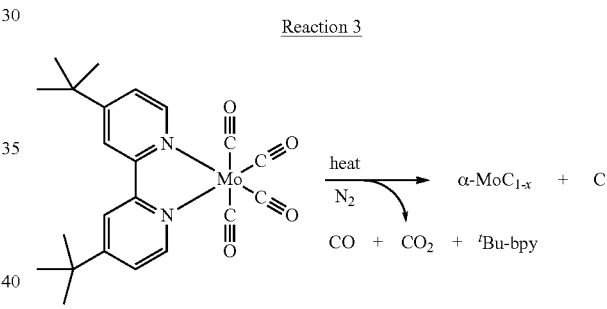

The thermal treatment, as shown herein, of [Mo(bpy)(CO)$_4$] and/or [Mo('Bu-bpy)(CO)$_4$] in an inert atmosphere at a temperature between about 250° C. and about 300° C. resulted in the formation of bulk molybdenum carbide as determined by X-ray diffraction (XRD) analysis. In addition, it was determined that modification of the bpy ligand with tert-butyl moieties has significant impact on the surface characteristics of the resultant catalysts. Notably the [Mo('Bu-bpy)(CO)$_4$] precursor yielded a catalyst with a BET surface area of 217 m$^2$/g, which corresponds to a 2.9-fold and 6.4-fold increase compared to the traditionally prepared β-Mo$_2$C and α-MoC$_{1-x}$, respectively (see Table 1). Furthermore, the acid-site density measured by ammonia temperature-programmed desorption of the catalysts prepared with [Mo(bpy)(CO)$_4$] was found to be 10-fold lower than the benchmark β-Mo$_2$C (145 μmol/g vs 1013 μmol/g, respectively), suggesting that this synthesis method enables tuning of the acid-site/H*-site ratio of the metal carbide catalysts. The acid-site/H*-site ratio may play an important role in the product slate observed during biomass upgrading or similar catalytic transformations. As described herein, these single-source molecular precursors can also be dispersed using incipient wetness impregnation (IW) on a commercially available support material such as an SiO$_2$ extrudate. This approach resulted in molybdenum carbide catalysts with about 28 wt % molybdenum metal loading on the silica support, using the [Mo('Bu-bpy)(CO)$_4$] precursor to generate the molybdenum carbide per the synthesis route described herein.

(CO)$_4$] (Reaction 3 above), according to some embodiments of the present disclosure. X-ray diffraction data provides evidence of the formation of bulk α-MoC$_{1-x}$ at different temperatures (in a range between about 250° C. and about

TABLE 1

Physico-chemical properties and catalytic activity data for molybdenum carbide catalysts prepared by the two synthetic routes reported here and the benchmark carburization-synthesized molybdenum carbide catalysts. Ethane site-time-yield calculated normalized to H*-adsorption sites

| Sample Description | Precursor | Phase by XRD | BET Surface Area ($m^2$/g) | Acid Sites (μmol/g) | H* Sites (μmol/g) | Ethane rate ($10^{-3}$ mol $h^{-1}$ $g_{cat}^{-1}$) | Ethane rate ($10^{-4}$ mol $h^{-1}$ $m^{-2}$) | Ethane STY ($10^{-6}$ $h^{-1}$) |
|---|---|---|---|---|---|---|---|---|
| Carburization at 600° C. | (NH$_4$)$_6$Mo$_7$O$_{24}$ | β-Mo$_2$C | 73 | 1013 | 94 | 8.87 | 1.17 | 94 |
| Nitridation followed by carburization at 700° C. | (NH$_4$)$_6$Mo$_7$O$_{24}$ | α-MoC$_{1-x}$ | 34 | 410 | — | — | — | — |
| bpy at 750° C. | Mo(bpy)(CO)$_4$ | α-MoC$_{1-x}$ | 28 | 145 | — | 4.96 | 1.77 | — |
| 'Bu-bpy at 850° C. | Mo('Bu-bpy)(CO)$_4$ | α-MoC$_{1-x}$ | 217 | — | — | — | — | — |
| OAm | MoCl$_5$ + OAm | β-Mo$_2$C | 174 | 120 | 14 | 7.35 | 0.42 | 525 |
| PEI: x = 1.6 | MoCl$_5$ + x PEI | β-Mo$_2$C | 57 | 48 | 20 | 5.50 | 0.96 | 275 |
| PEI: x = 3.2 | MoCl$_5$ + x PEI | α-MoC$_{1-x}$ + β-Mo$_2$C | 269 | 270 | 23 | 10.1 | 0.37 | 439 |
| PEI: x = 6.3 | MoCl$_5$ + x PEI | α-MoC$_{1-x}$ | 436 | 430 | 49 | 18.2 | 0.42 | 371 |

The molecular precursors [Mo(bpy)(CO)$_4$] and [Mo('Bu-bpy)(CO)$_4$] were prepared by heating Mo(CO)$_6$ in toluene at reflux with 2,2'-dipyridyl and 4,4'-di-tert-butyl-2,2'-dipyridyl, respectively. The precursors were then heated at a temperature ramp rate of about 5° C./min in a nitrogen stream (~5 L/min) to various final temperatures (ranging between about 250° C. and about 950° C.) with, in some embodiments, hold times at the final target temperature for periods of time between about 30 minutes and about 24 hours. After cooling to room temperature, the resultant MoC catalyst was passivated with 1% oxygen in nitrogen for at least two hours before handling in air. For the synthesis of molybdenum carbides supported on silica, SiO$_2$ extrudates (Saint Gobain SS61138, 3 mm pellets) were crushed to powder and subjected to multiple sequential incipient wetness impregnations. A single impregnation consisted of the dropwise addition of a solution containing [Mo('Bu-bpy)(CO)$_4$] in tetrahydrofuran (corresponding to a theoretical Mo loading of 5.7 wt %) to the SiO$_2$ powder. The impregnated material was dried in air for a period of time between about 1 hour and about 5 hours. In this example, this procedure was repeated five times to target a final Mo loading of about 28%. The resulting material was then heated at a temperature ramp rate of about 5° C./min in a nitrogen stream to various final temperatures (between about 550° C. and about 750° C.) to track the resulting carbide phases as a function of synthesis temperature. The catalyst was passivated with 1% oxygen in nitrogen for at least two hours prior to handling in air.

FIG. 1 illustrates XRD data of molybdenum carbide obtained from the thermal decomposition of [Mo(bpy)(CO)$_4$] (Reaction 2 above), according to some embodiments of the present disclosure. The X-ray diffraction data provides evidence of the formation of bulk α-MoC$_{1-x}$ at different temperatures (in a range between about 350° C. and about 950° C.) and the qualitative observation of an increased crystallite size with increasing temperature as indicated by sharper peaks after treatment at higher temperatures.

Figure 2:
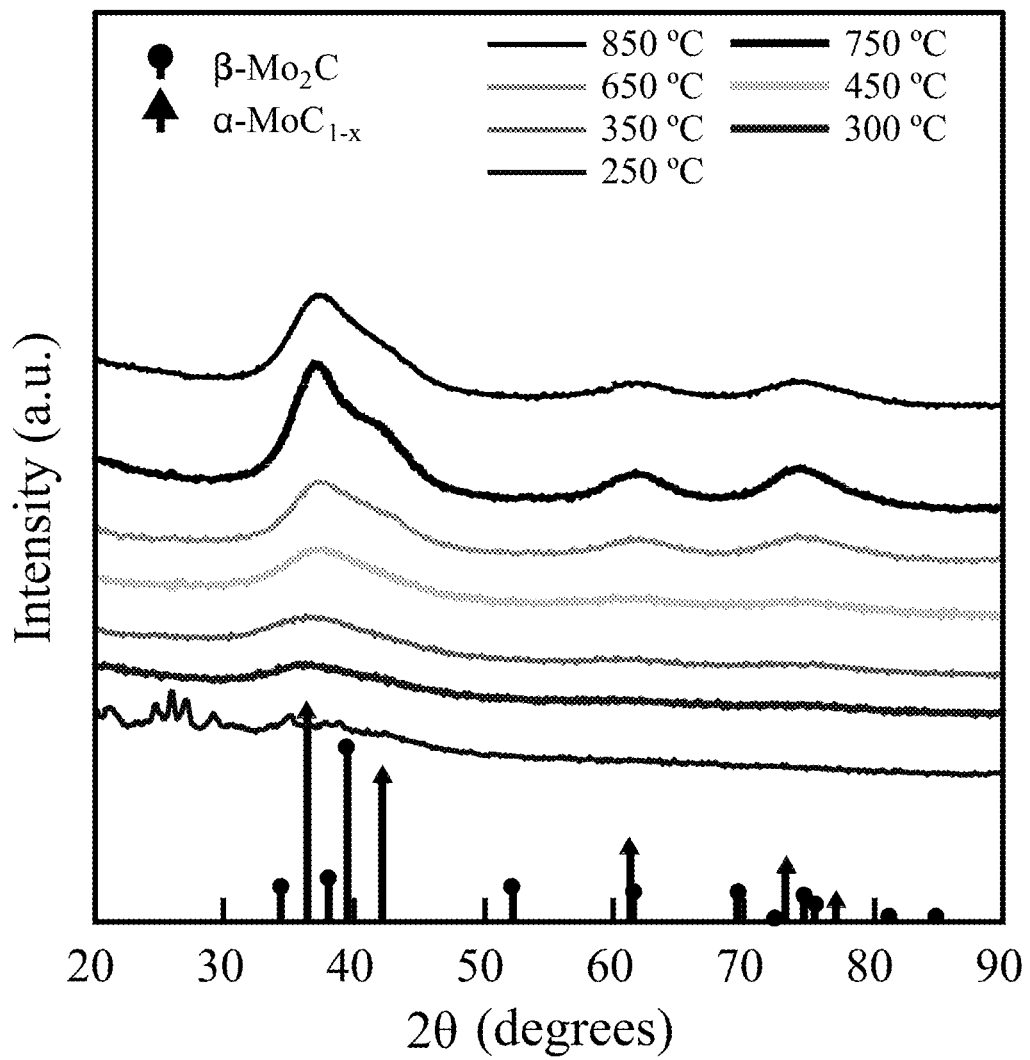
FIG. 2 illustrates XRD data of molybdenum carbide obtained from the thermal decomposition of [Mo('Bu-bpy)(CO)$_4$], according to some embodiments of the present disclosure.

FIG. 2 illustrates XRD data of molybdenum carbide obtained from the thermal decomposition of [Mo('Bu-bpy) (CO)$_4$] (Reaction 3 above), according to some embodiments of the present disclosure. X-ray diffraction data provides evidence of the formation of bulk α-MoC$_{1-x}$ at different temperatures (in a range between about 250° C. and about 850° C.) and the qualitative observation of an increased crystallite size with increasing temperature as indicated by sharper peaks after treatment at higher temperatures.

Figure 3:
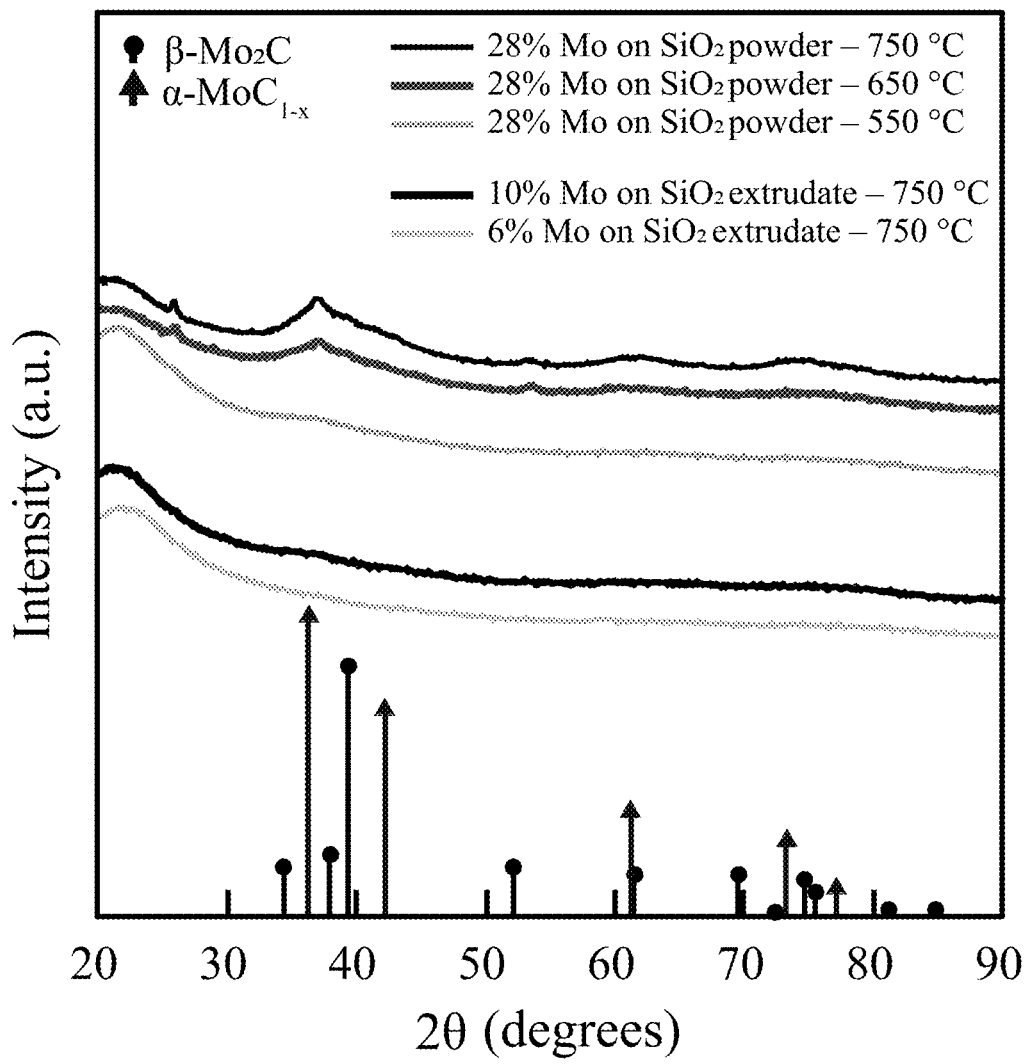
FIG. 3 illustrates XRD data of molybdenum carbide obtained from the thermal decomposition of [Mo('Bu-bpy)(CO)$_4$] supported on silica, according to some embodiments of the present disclosure.

FIG. 3 illustrates XRD data of molybdenum carbide obtained from the thermal decomposition of [Mo(Bu-bpy)(CO)$_4$] supported on silica, according to some embodiments of the present disclosure. X-ray diffraction data provides evidence of the formation of bulk α-MoC$_{1-x}$ at different temperatures (in a range between about 550° C. and about 750° C.) and the qualitative observation of an increased crystallite size with increasing temperature as indicated by sharper peaks after treatment at higher temperatures.

Table 1 below illustrates the physico-chemical properties of molybdenum carbides produced by the thermal degradation of [Mo(bpy)(CO)$_4$] and [Mo('Bu-bpy)(CO)$_4$] (as well as by a second route, described below), compared to molybdenum carbides made by other routes, including the second novel route to molybdenum carbide described below (the "gel intermediate" route). Table 1 shows that [Mo(bpy)(CO)$_4$] can produce a carbide having a relatively low acid site density compared to incumbent molybdenum carbides, whereas [Mo('Bu-bpy)(CO)$_4$] can produce a carbide having extremely high surface areas compared to incumbent molybdenum carbides.

Carbides prepared using [Mo(bpy)(CO)$_4$] demonstrated a surface area normalized ethylene hydrogenation rate ~50% higher than the benchmark β-Mo$_2$C catalyst. These results indicate that despite having a lower surface area, the molecular precursor-derived carbide possesses more active catalytic sites for ethylene hydrogenation than the carburization-synthesized benchmark β-Mo$_2$C catalysts.

Referring again to Scheme 1, in addition to [Mo(bpy)(CO)$_4$] and [Mo(Bu-bpy)(CO)$_4$], [Mo(Me-bpy)(CO)$_4$], [Mo(nonyl-bpy)(CO)$_4$], and [Mo(TMEDA)(CO)$_4$] were synthesized in the lab. The methods used to synthesize each is described below.

Synthesis of [Mo(Me-bpy)(CO)$_4$]. The synthesis of [Mo(Me-bpy)(CO)$_4$] was adapted from *J. Chem. Soc.,* 1962, 4712, which is incorporated by reference herein in its entirety. A three-neck round bottom flask equipped with a reflux condenser was charged with Mo(CO)$_6$ (1 equiv), 4,4'-dimethyl-2,2'-dipyridyl (1 equiv), and 100 mL toluene. The mixture was refluxed for 1.5 hours under an inert atmosphere, after which the reaction was cooled to room temperature. The product was then cooled to −18° C., resulting in the formation of orange-red crystals. The crystals were collected by filtration, washed with toluene and hexane, and then dried under reduced pressure.

Synthesis of [Mo(nonyl-Bpy)(CO)$_4$] The synthesis of [Mo(nonyl-bpy)(CO)$_4$] was adapted from *J. Chem. Soc.*, 1962, 4712, which is incorporated by reference herein in its entirety. Briefly, a three-neck round bottom flask equipped with a reflux condenser was charged with Mo(CO)$_6$ (1 equiv), 4,4'-dinonyl-2,2'-bipyridine (1 equiv), and 25 mL toluene. The mixture was refluxed for 1.5 hours under an inert atmosphere, after which the reaction was cooled to room temperature. The product was then filtered, and the solvent was removed under reduced pressure to give a red oil. The oil was cooled to −18° C., resulting in the formation of orange crystals. The crystals were collected and dried under reduced pressure.

Synthesis of [Mo(TMEDA)(CO)$_4$] The synthesis of [Mo(TMEDA)(CO)$_4$] was adapted from *J. Chem. Soc.*, 1962, 4712, which is incorporated by reference herein in its entirety. A three-neck round bottom flask equipped with a reflux condenser was charged with Mo(CO)$_6$ (1 equiv), N,N,N',N'-tetramethylethylenediamine (TMEDA, 1.1 equiv), and 25 mL toluene. The mixture was refluxed for 1.5 hours under an inert atmosphere, after which the reaction was cooled to room temperature. The product was then filtered, and the solvent was reduced to half volume and then cooled to −18° C. overnight, resulting in the formation of yellow crystals. The crystals were collected, washed with pentane, and dried under reduced pressure.

Synthesis of [Mo(en)(CO)$_4$] The synthesis of [Mo(en)(CO)$_4$] was adapted from *J. Chem. Soc.*, 1962, 4712, which is incorporated by reference herein in its entirety. A three-neck round bottom flask equipped with a reflux condenser was charged with Mo(CO)$_6$ (1 equiv), ethylenediamine (en, 1.1 equiv), and 25 mL toluene. The mixture was refluxed for 1.5 hours under an inert atmosphere, after which the reaction was cooled to room temperature. The tan precipitate was then collected by filtration and dried under reduced pressure.

Synthesis of [Mo(phen)(CO)$_4$]. The synthesis of [Mo(phen)(CO)$_4$] was adapted from *Eur. J. Inorg. Chem.*, 2016, 3829, which is incorporated by reference herein in its entirety. A 50 mL round bottom flask was charged with Mo(CO)$_6$ (1 equiv), phenanthroline (1 equiv), and 25 mL toluene. The mixture was heated to 80° C. for 4 hours, after which the reaction was cooled to room temperature. The red-brown precipitate was then collected by filtration, washed with pentane, and collected. The solid was dried under reduced pressure.

Synthesis of [Mo(pip)$_2$(CO)$_4$] The synthesis of [Mo(pip)$_2$(CO)$_4$] was adapted from *Inorg. Chem.*, 1978, 2680, which is incorporated by reference herein in its entirety. A three-neck round bottom flask equipped with a reflux condenser was charged with Mo(CO)$_6$ (1 equiv), piperidine (6.7 equiv), and 120 mL heptane. The mixture was refluxed for 4 hours under an inert atmosphere, after which the reaction was filtered while hot. The yellow solid was washed with cold heptane and dried under reduced pressure.

Figure 4:
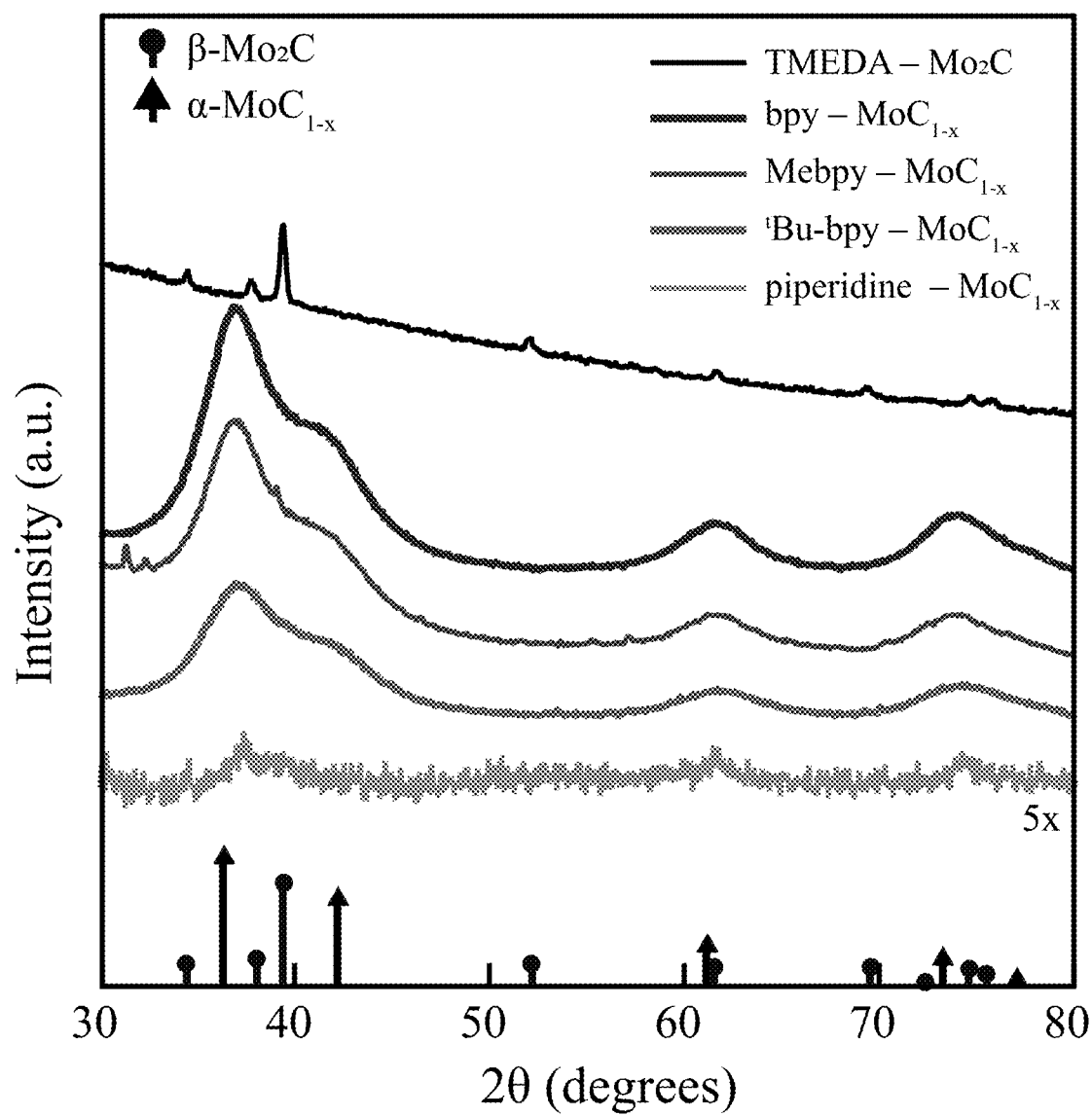
FIG. 4 illustrates XRD data of molybdenum carbides prepared from various molecular precursors, according to some embodiments of the present disclosure.

FIG. 4 illustrates XRD data of molybdenum carbides synthesized using the molecular precursor route, according to some embodiments of the present disclosure. The thermal treatment, as shown herein, of the five single-source molecular precursors, in an inert atmosphere at a temperature between about 250° C. and about 750° C., resulted in the formation of α-MoC$_{1-x}$, with the exception of [Mo(TMEDA)(CO)$_4$], which formed β-Mo$_2$C, as determined by X-ray diffraction (XRD) analysis. These results reveal that variation of the atomic composition of the molecular precursors that undergo thermal decomposition serve as a method toward controlling the phase of the resultant transition metal carbides.

The second route to producing metal carbides, the "gel-intermediate" route, is illustrated in Reaction 4 below:

Reaction 4

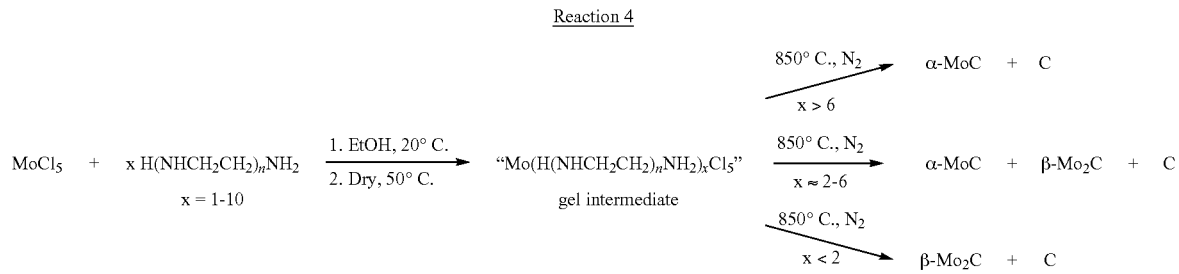

Reaction 4 provides several manufacturing benefits including that it can provide materials with tunable surface areas and acid site densities. In general, Reaction 4 illustrates a two-step process. The first step reacts a functionalized metal (e.g., molybdenum ionically bonded to chloride ions) with an amine-containing molecule (e.g., polyethylenimine) resulting in the formation of the "gel-intermediate". The second step thermally degrades the gel-intermediate, resulting in the forming of a metal carbide (e.g., molybdenum carbide). This second route to molybdenum carbide allows selection for α-MoC$_{1-x}$ and/or β-Mo$_2$C. In addition, the resultant metal carbide provides highly tunable ethylene hydrogenation activity, as shown below. As shown in Reaction 4, x, the ratio of the second reactant (e.g., PEI) to the first reactant (e.g., MoCl$_5$), may be between 1 and 10, inclusively. n may be between 1 and 20 inclusively. As shown below, the tunability may be provided by changing the stoichiometric ratio of the first reactant, a molybdenum source, with the second reactant, an amine-containing molecule (e.g., hydrocarbon chain). Examples of the first reactant include MoX$_5$ (where X is any halide ion, e.g., Cl, Br), (NH$_4$)$_6$Mo$_7$O$_{24}$, Mo(CO)$_6$, Mo metal, MoO$_2$, and/or MoO$_3$. Examples of the second reactant include oleylamine (OAm), polyethylenimine (PEI), N,N'-Bis(3-aminopropyl)-1,4-diaminobutane, as well as other linear and/or branched amines, polyamines, and/or amine-functionalized polymers. is shown as x in Reaction 4.

Reaction 5 illustrates a generalized form of Reaction 4:

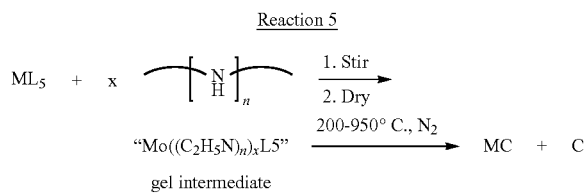

For the example of thermal reactions of $MoCl_5$ and PEI, the phase of the molybdenum carbide produced could be controlled, with only $\beta$-$Mo_2C$ formed at PEI:$MoCl_5$ mass ratios of about 0.25 and lower (molar ratio x=about 1.6), only $\alpha$-$MoC_{1-x}$ formed at mass ratios of about 1 and higher (x=about 6.3 and higher), and a mixture of alpha and beta phases formed in between (e.g., at a PEI:$MoCl_5$ mass ratio of about 0.5 (x=3.2) or between about 0.3 and about 0.9 (x=between about 2 and about 6).

Furthermore, the surface areas of all of the molybdenum carbides produced by Reaction 4 were significantly higher than the established urea glass route (which produces material having surface areas between about 10 and about 22 $m^2/g$) and were also tunable. The material derived by the second route described herein, via Reaction 4, can have surface areas of 152 $m^2/g$ and higher (see Table 1), providing at least a 10-fold increase relative to the previously described route. Thus, this second route provides a way to synthesize molybdenum carbides having very high and tunable surface areas ranging from about 48 $m^2/g$ up to about 436 $m^2/g$. Surface area is a critical property of catalyst materials which can be used to control their catalytic performance in numerous catalytic applications. Carbides prepared using oleylamine and PEI demonstrate significantly higher surface area than carburization-synthesized $\beta$-$Mo_2C$. Furthermore, the catalytic activity of these catalysts for ethylene hydrogenation to produce ethane has been tested and found to exhibit activity that is comparable to or better than carburization-derived materials. The site-time-yield for ethylene hydrogenation (normalized by H*-adsorption sites) on OAm and PEI-derived catalysts is between about three times and about six times higher than the benchmark $Mo_2C$. Variable acid site density in molybdenum carbide catalysts prepared with varying PEI:$MoCl_5$ ratios demonstrates the ability to control and tune the physico-chemical properties of these transition metal carbides.

Figure 5A:
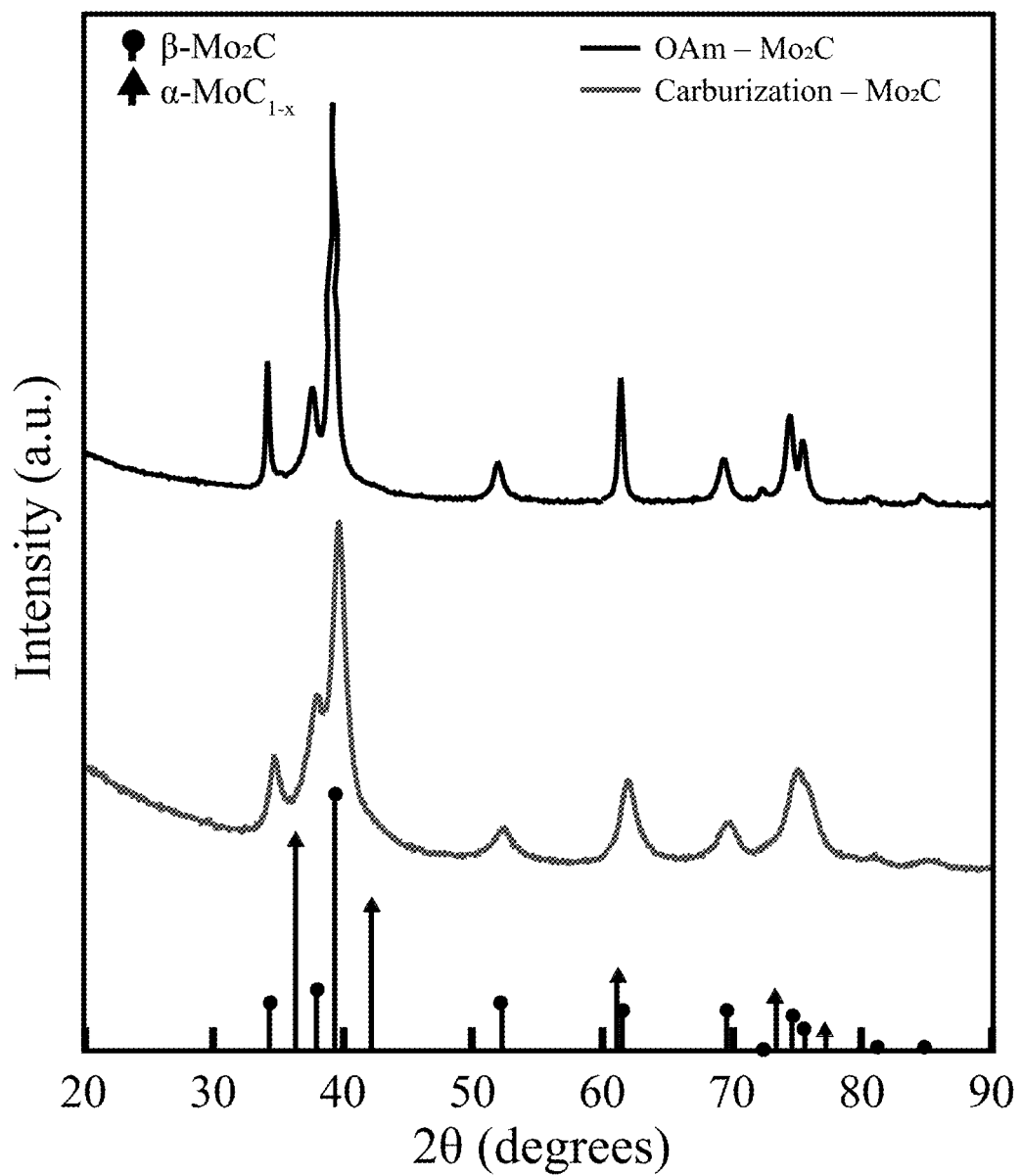
FIGS. 5A and 5B illustrate XRD data of molybdenum carbides prepared by both OAm and PEI gel-based carburization-free routes, respectively, according to some embodiments of the present disclosure.
Figure 5B:
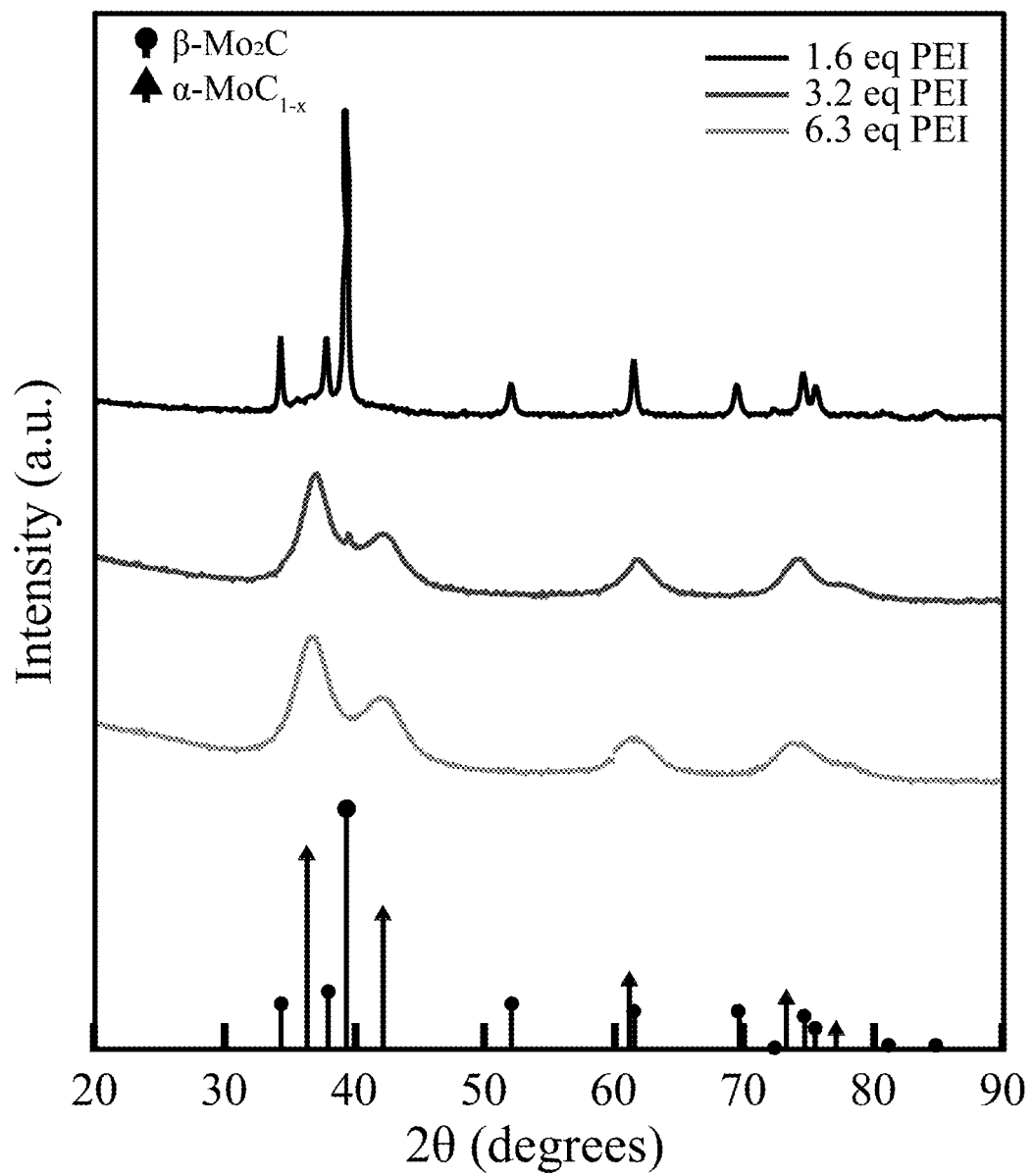

The molybdenum carbides synthesized by the second route shown in Reaction 4 were made as follows. Briefly, a portion of $MoCl_5$ was dissolved in ethanol and stirred with a quantity of either oleylamine (OAm) or polyethyleneimine (PEI) in an amine:$MoCl_5$ mass ratio between about 0.25:1 and about 1:1, as noted in Table 1. The mixture was then dried at about 100° C. in air prior to thermal treatment at about 850° C. performed in a $N_2$ environment to form the carbide phase without the use of costly and flammable carburization gas (15% $CH_4/H_2$). The carburization-synthesized $\beta$-$Mo_2C$ catalyst used for comparison was prepared using previously reported methods which involves heating ammonium paramolybdate in 15% $CH_4/H_2$ at about 600° C. Both the identity and quantity of amine used in the synthesis of the $MoC_x$ catalysts had a significant impact on the crystal phase and overall physical properties of the resultant material. As shown in FIGS. 5A and 5B, both amines were capable of producing pure-phase $\beta$-$Mo_2C$ with an amine:Mo mass ratio of about 0.25:1. A mixed-phased $\alpha$-$MoC_{1-x}/\beta$-$Mo_2C$ product was obtained with the intermediate mass ratio of about 0.5:1 PEI:$MoCl_5$, and a higher mass ratio of about 1.0:1.0 PEI:$MoCl_5$ yielded pure-phase $\alpha$-$MoC_{1-x}$. Comparing the three materials prepared using PEI, it is interesting to note that the surface area increased as a function of the PEI:$MoCl_5$ mass ratio (Table 1). These values are nearly 4-fold that of the carburization-synthesized $Mo_2C$ material in the case of 1.0:1.0 PEI:$MoCl_5$ $MoC_{1-x}$. Similarly, the acid site densities of the three carbides made using PEI also increased with increasing PEI:$MoCl_5$ ratio. The increased surface area and acid site density likely result from increased isolation of Mo atoms with higher concentrations of the dendritic PEI polymer during the conversion from the Mo-gel to the carbide material at high temperatures.

Figure 6:
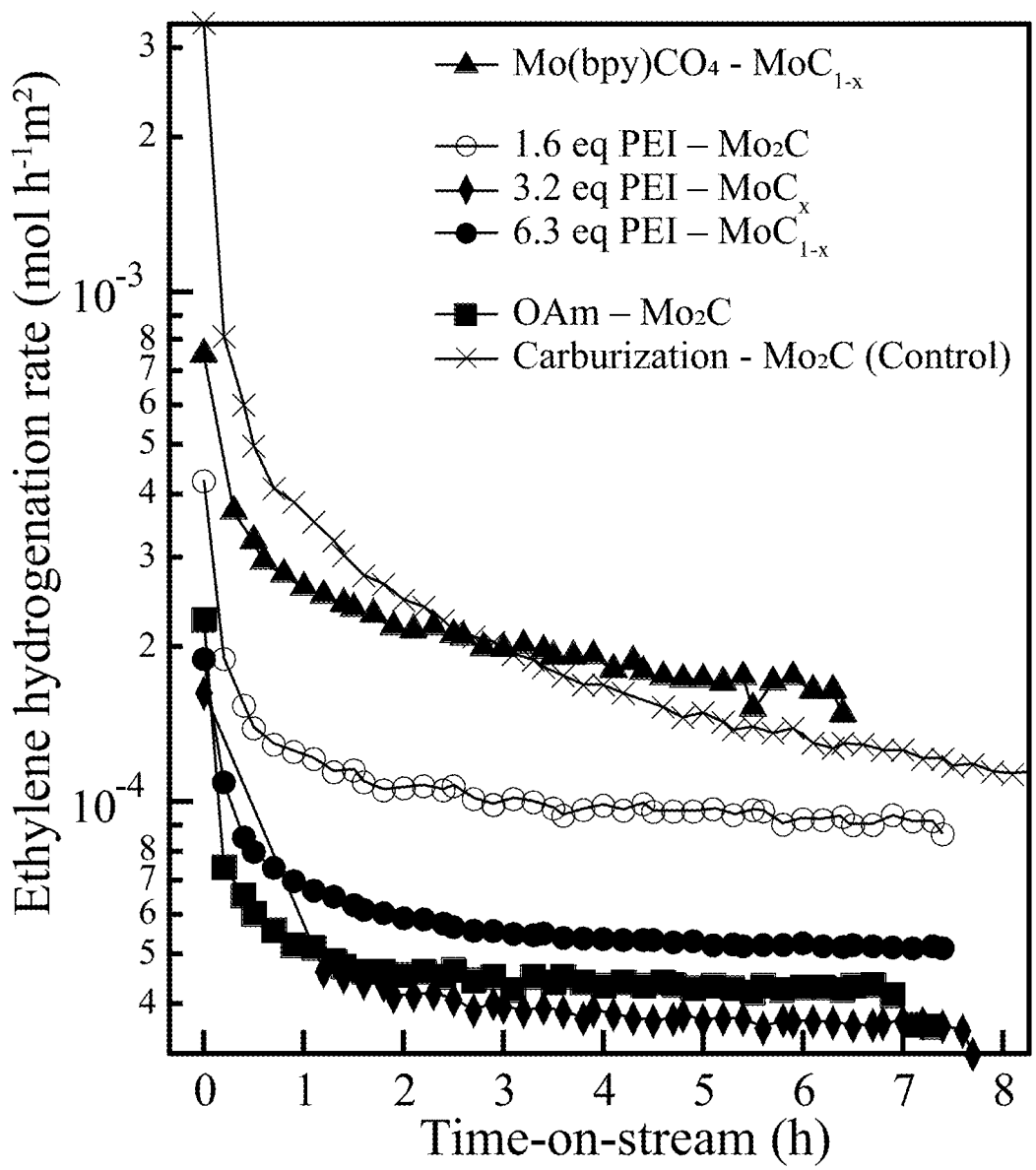
FIG. 6 illustrates ethylene hydrogenation rates as a function of time on stream, using molybdenum carbide catalyst produced by the thermal decomposition (at 750° C.) of [Mo(bpy)(CO)$_4$], PEI-based Mo-gels at three distinct PEI-Mo ratios, and an OAm-based gel, according to some embodiments of the present disclosure.

FIG. 6 illustrates ethylene hydrogenation rates (normalized by specific surface area) as a function of time on stream, using a molybdenum carbide catalyst produced by the thermal decomposition of [Mo(bpy)(CO)$_4$] at about 750° C. (Reaction 2 above), according to some embodiments of the present disclosure. Carburization-$Mo_2C$ refers to $\beta$-$Mo_2C$ prepared via carburization and Mo(bpy)CO$_4$—$MoC_{1-x}$ refers to the $\alpha$-$MoC_{1-x}$ prepared by thermal decomposition of [Mo(bpy)(CO)$_4$] at 750° C. Ethylene hydrogenation was performed at about 400° C., about 1 atm, WHSV=~1.15 $g_{ethylene} g_{cat}^{-1} h^{-1}$, and ~10:1 H$_2$:ethylene feed. These results demonstrate the utility of the molecular precursor-synthesized $\alpha$-$MoC_{1-x}$ for selective conversion of biomass-derived model compounds and biomass upgrading. Also, shown in FIG. 6 are ethylene hydrogenation rates of molybdenum carbide catalysts produce using the "gel intermediate" route, where three different catalysts were produced at different PEI-Mo ratios. Mo(bpy)(CO)$_4$-derived $MoC_{1-x}$ yielded an ethylene hydrogenation rate similar to carburization-derived $Mo_2C$ but with higher time-on-stream stability. Mo(bpy) CO$_4$-derived $MoC_{1-x}$ showed an initial deactivation in ethylene hydrogenation rate but reached a steady-state value (<5% change in 5 h time-on-stream) after 2 hours whereas carburization-derived $Mo_2C$ continued to deactivate (>5% change) even after 7 hours time-on-stream. OAm-derived $Mo_2C$ resulted in surface area normalized ethylene hydrogenation rate lower than benchmark carburization-derived $Mo_2C$ but on normalization by H*-chemisorption sites, gave an ethane site-time-yield 5.6-fold higher (525 h$^{-1}$ on $Mo_2C$—OAm vs 94 h$^{-1}$ on Carburization—$Mo_2C$) as shown in Table 1. Ethylene hydrogenation rates on PEI-based $MoC_x$ catalysts varied with PEI:$MoCl_5$ molar ratio x, where x=1.6 eqiv PEI-$Mo_2C$ resulted in the highest surface-area-normalized hydrogenation rate. The H*-chemisorption sites normalized ethane hydrogenation rate (as shown in Table 1) on the PEI-$MoC_x$ catalysts were 2.9-fold to 4.7-fold higher than the carburization-$Mo_2C$

EXAMPLE SET #1

Example 1. A method for producing a metal carbide, the method comprising: thermally treating a molecular precursor in an oxygen-free environment, wherein: the treating produces the metal carbide, the molecular precursor comprises

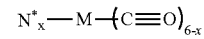

M is the metal of the metal carbide, N* comprises nitrogen or a nitrogen-containing functional group, and x is between zero and six, inclusively.

Example 2. The method of Example 1, wherein: N* comprises at least one of

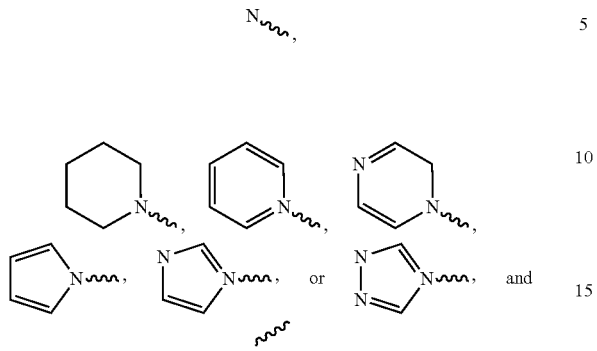

indicates the bond between N* and M.

Example 3. The method of Example 1, wherein: x is equal to two, and the molecular precursor comprises

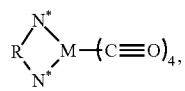

wherein: R comprises at least one of a covalent bond or a linking group.

Example 4. The method of Example 3, wherein the linking group comprises a hydrocarbon.

Example 5. The method of Example 4, wherein the hydrocarbon is a branched hydrocarbon or a straight-chained hydrocarbon.

Example 6. The method of Example 4, wherein the hydrocarbon is a saturated hydrocarbon or an unsaturated hydrocarbon.

Example 7. The method of Example 3, wherein x is equal to three and three N* functional groups are covalently linked by R.

8. The method of Example 1, wherein the molecular precursor comprises at least one of [Mo(bpy)(CO)$_4$], [Mo('Bu-bpy)(CO)$_4$], [Mo(Me-bpy)(CO)$_4$], [Mo(ethyl-bpy)(CO)$_4$], [Mo(nonyl-bpy)(CO)$_4$], [Mo(neopentyl-bpy)(CO)$_4$], [Mo(en)(CO)$_4$], [Mo(TMEDA)(CO)$_4$], [Mo(bipz)(CO)$_4$], [Mo(phen)(CO)$_4$], [Mo(pzquin)(CO)$_4$], or [Mo(b-taz)(CO)$_4$].

9. The method of Example 1, wherein the molecular precursor comprises at least one of

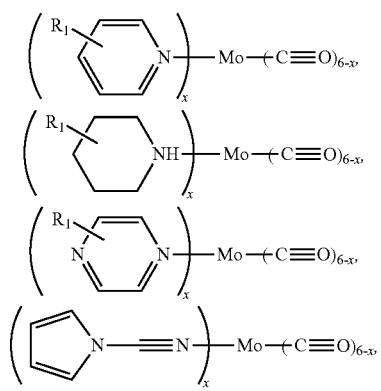

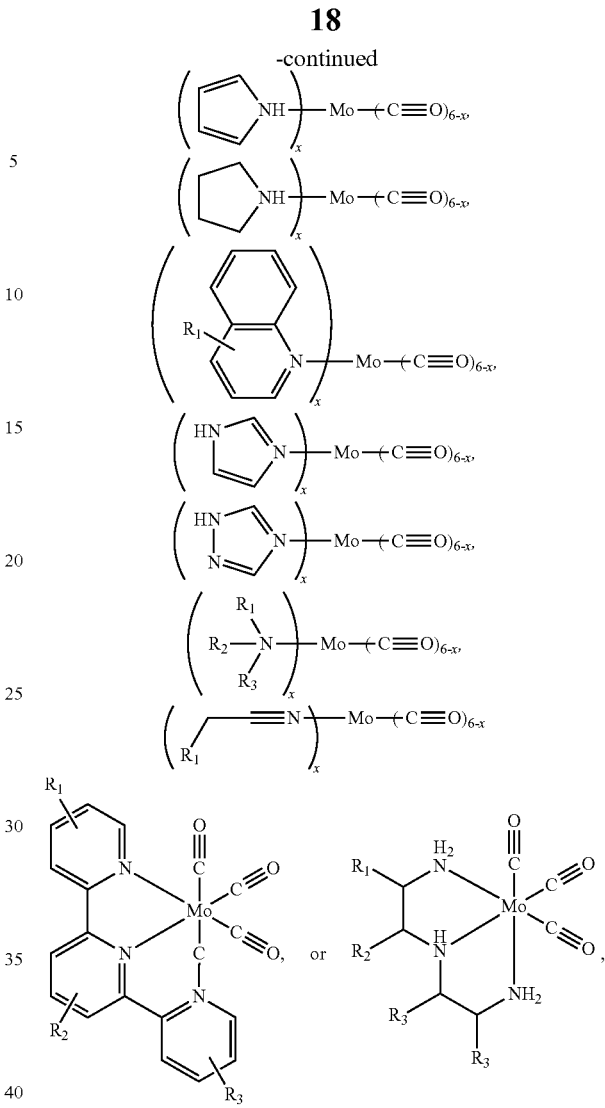

and each of $R_1$, $R_2$, and $R_3$ comprise at least one of a hydrogen atom or a hydrocarbon.

10. The method of Example 9, wherein the hydrocarbon is a branched hydrocarbon or a straight-chained hydrocarbon.

11. The method of Example 9, wherein the hydrocarbon is a saturated hydrocarbon or an unsaturated hydrocarbon.

12. The method of Example 1, wherein the treating is performed by heating the molecular precursor to a temperature between about 150° C. and about 1000° C.

13. The method of Example 11, wherein the temperature is between about 200° C. and about 800° C.

14. The method of Example 1, wherein the metal carbide comprises at least one of β-Mo$_2$C or α-MoC$_{1-x}$ and 0≤x<1.

EXAMPLE SET #2

Example 1. A method for producing a metal carbide, the method comprising: reacting a metal-containing precursor comprising at least one of ML$_u$ or MX$_v$ with an amine-containing molecule (NR) to produce a gel intermediate comprising at least one of M(NR)$_x$L$_y$ or M(NR)$_x$X$_z$, and thermally treating the gel intermediate in an oxygen-free environment, wherein: the treating produces the metal carbide, M is the metal of the metal carbide, L is a functional group covalently bonded to M, X is a functional group ionically bonded to M, $0 \le u \le 6$, $0 \le v \le 6$, $1 \le x \le 10$, $y \le u$, and $z \le v$.

Example 2. The method of Example 1, wherein: the amine-containing molecule comprises an amine (NR'$_3$), and R' comprises at least one of a hydrogen atom or a hydrocarbon.

Example 3. The method of Example 2, wherein each R' may be the same or different.

Example 4. The method of Example 2, wherein the hydrocarbon comprises at least one of a straight-chained hydrocarbon or a branched hydrocarbon.

Example 5. The method of Example 2, wherein the hydrocarbon comprises at least one of a saturated hydrocarbon or an unsaturated hydrocarbon.

Example 6. The method of Example 1, wherein: the amine-containing molecule comprises a polyamine (NR')$_n$, R' comprises at least one of a covalent bond or a linking group, and n is between 1 and 2000, inclusive.

Example 7. The method of Example 6, wherein each R' may be the same or different.

Example 8. The method of Example 6, wherein the linking group comprises a hydrocarbon.

Example 9. The method of Example 8, wherein the hydrocarbon comprises at least one of a straight-chained hydrocarbon or a branched hydrocarbon.

Example 10. The method of Example 8, wherein the hydrocarbon comprises at least one of a saturated hydrocarbon or an unsaturated hydrocarbon.

Example 11. The method of Example 6, wherein the polyamine comprises at least one of a polyethylenimine (PEI), N,N'-bis(3-aminopropyl)-1,4-diaminobutane, 4-amino-1-(3-aminopropylamino)butane, or tris(2-aminoethyl)amine.

Example 12. The method of Example 2, wherein the amine-containing molecule may be saturated or unsaturated.

Example 13. The method of Example 11, wherein the amine-containing molecule comprises at least one of a short-chain amine or a fatty amine.

Example 14. The method of Example 13, wherein the short-chain amine comprises at least one of tert-butylamine, a propylamine, propenylamine, butylamine, pentylamine, hexylamine, heptylamine, triethylamine, tributylamine, or trioctylamine.

Example 15. The method of Example 13, where the fatty amine comprises at least one of oleylamine (OAm), dodecylamine, octadecylamine, octylamine, or trioctylamine.

Example 16. The method of Example 1, wherein M comprises molybdenum.

Example 17. The method of Example 1, wherein X comprises a halide.

Example 18. The method of Example 1, wherein L comprises at least one of carbon, oxygen, nitrogen, or hydrogen.

Example 19. The method of Example 18, wherein L comprises carbon monoxide.

Example 20. The method of Example 1, wherein v is 5 and X comprises at least one of chloride, iodide, fluoride, or bromide.

Example 21. The method of Example 1, wherein the metal-containing precursor comprises at least one of (NH$_4$)$_6$Mo$_7$O$_{24}$, Mo(CO)$_6$, MoCl$_5$, Mo metal, MoO$_2$, or MoO$_3$.

Example 22. The method of Example 1, wherein the treating is performed by heating the molecular precursor to a temperature between about 150° C. and about 1000° C.

Example 23. The method of Example 22, wherein the temperature is between about 200° C. and about 800° C.

Example 24. The method of Example 1, wherein the metal carbide comprises at least one of β-Mo$_2$C, α-MoC$_{1-x}$, or an amorphous carbide MoC$_{1-x}$, and $0 \le x < 1$.

EXAMPLE SET #3

Example 1. A composition comprising: at least one of β-Mo$_2$C or α-MoC$_{1-x}$, wherein: $0 \le x < 1$, and a surface area between about 20 m$^2$/g and about 500 m$^2$/g.

Example 2. The composition of Example 1, further comprising an acid site having a concentration between about 40 μmol/g and about 430 μmol/g.

Example 3. The composition of Example 1, further comprising a hydrogen adsorption site having a concentration between about 10 μmol/g and about 60 μmol/g.

Example 4. The composition of Example 1, wherein the composition is synthesized by thermally treating a molecular precursor.

Example 5. The composition of Example 1, wherein the composition is synthesized by thermally treating a gel-intermediate.

Example 6. A method comprising: hydrogenating a reactant by contacting the reactant and hydrogen (H$_2$) with a catalyst, wherein: the reactant comprising a carbon-carbon double-bond, and the catalyst comprises: at least one of β-Mo$_2$C or α-MoC$_{1-x}$, $0 \le x < 1$, and a surface area between about 20 m$^2$/g and about 500 m$^2$/g.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A method for producing a metal carbide, the method comprising:
   thermally treating a molecular precursor in an oxygen-free environment, wherein:
   the treating produces the metal carbide,
   the molecular precursor comprises

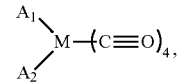

M is the metal of the metal carbide,

A₁ comprises a first nitrogen-containing functional group, and

A₂ comprises a second nitrogen-containing functional group.

2. The method of claim 1, wherein:

A₁ and A₂ independently comprise at least one of

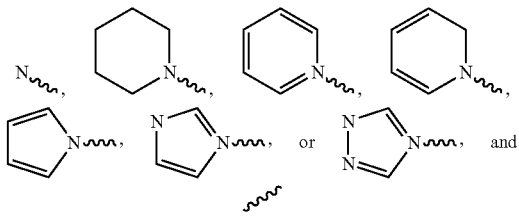

and indicates a bond between A₁ and M and a bond between A₂ and M.

3. The method of claim 1, wherein:

A₁ and A₂ are covalently linked such that the the molecular precursor comprises

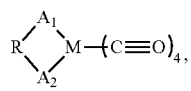

and

R comprises at least one of a covalent bond or a linking group.

4. The method of claim 3, wherein the linking group comprises a hydrocarbon.

5. The method of claim 4, wherein the hydrocarbon is a branched hydrocarbon or a straight-chained hydrocarbon.

6. The method of claim 4, wherein the hydrocarbon is a saturated hydrocarbon or an unsaturated hydrocarbon.

7. The method of claim 3, wherein the molecular precursor comprises at least one of

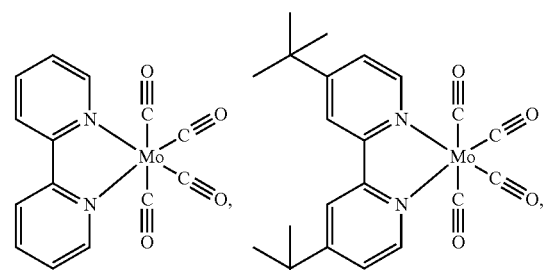

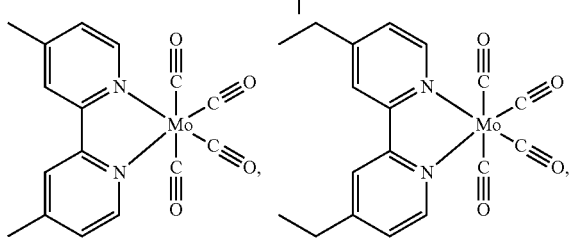

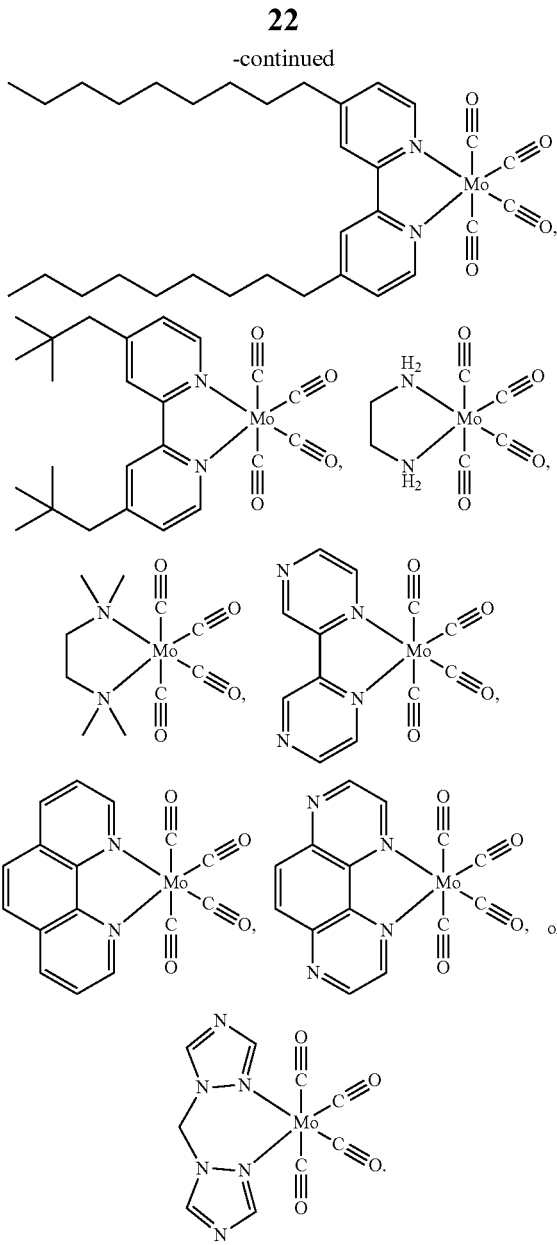

8. The method of claim 1, wherein:

the molecular precursor comprises at least one of

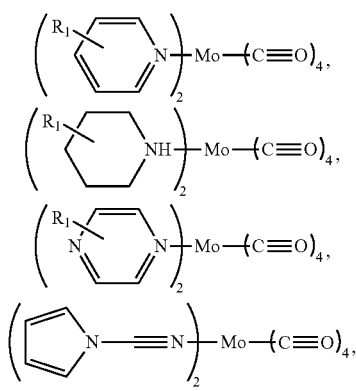

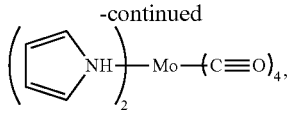
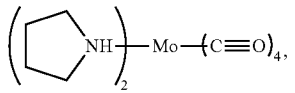
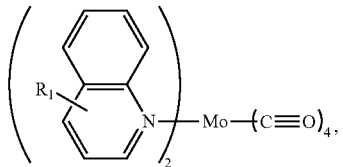
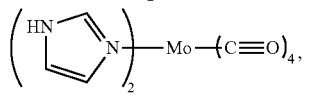
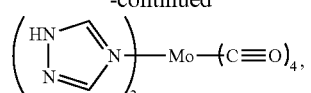
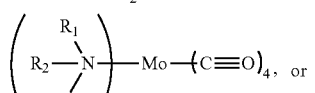
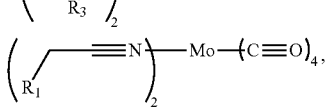
and
each of $R_1$, $R_2$, and $R_3$, independently comprise at least one of a hydrogen atom or a hydrocarbon.
* * * * *